UNITED STATES PATENT OFFICE.

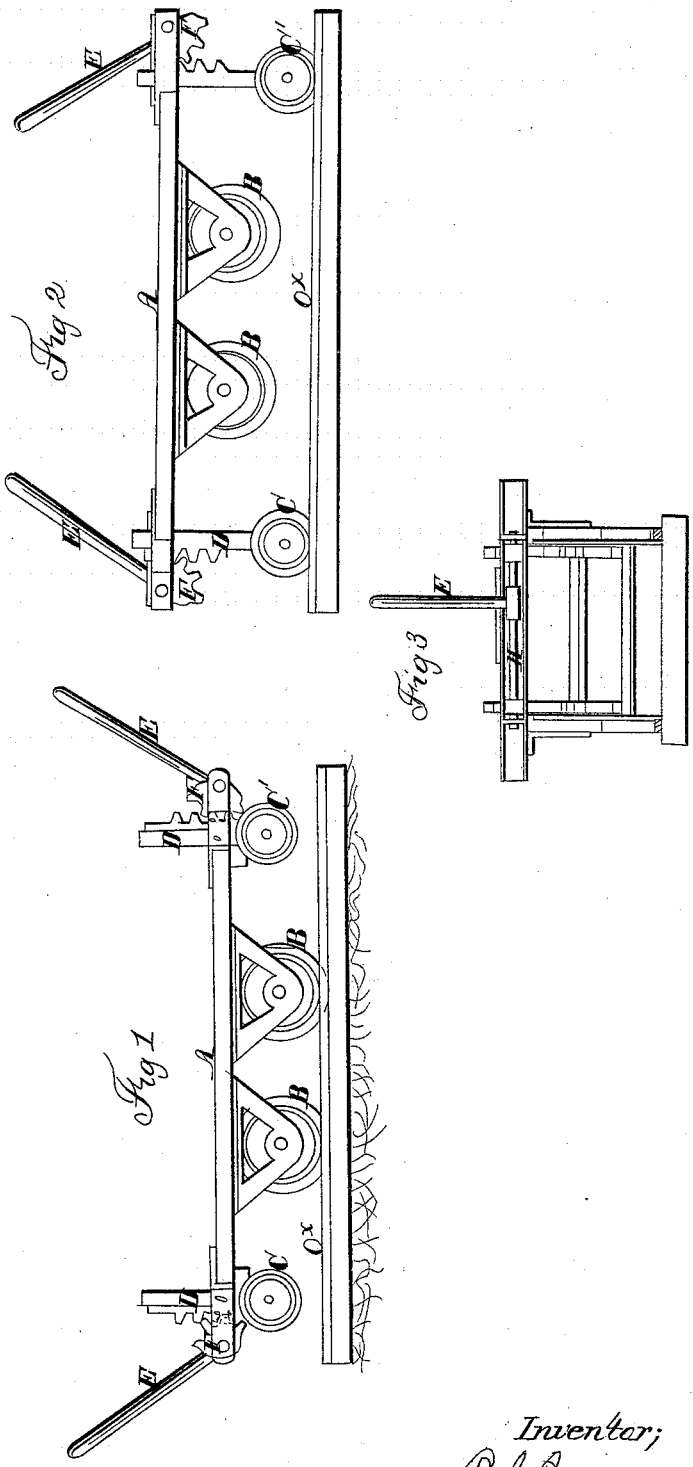

PETER I. BIDERMAN, OF PHILADELPHIA, PENNSYLVANIA.

CONVEYING CITY RAILROAD-CARS OVER OBSTRUCTIONS.

Specification of Letters Patent No. 30,289, dated October 9, 1860.

*To all whom it may concern:*

Be it known that I, PETER I. BIDERMAN, of Philadelphia, in the State of Pennsylvania, have invented certain new and useful Improvements in Modes of Elevating Cars Over Obstructions, &c.; and I do hereby declare that the following is a full, clear, and exact description of the same, reference being had to the accompanying drawings and to the letters of reference marked thereon.

In the annexed drawings, making a part of this specification, A represents the car body and B, B, represent the wheels, which usually support said body, both being constructed in any convenient known manner and of any desired size.

C, C', represent trucks which are secured to the front and rear of the car body. The shafts of these truck wheels are provided with rack bars D, D, which pass through proper slots or openings in the body to receive them.

H H, represent shafts which are secured at the front and rear of the body in proper bearings and which have attached to them the levers E, E, by means of which they are made to partially revolve. Secured upon the shafts H, H, are the cogged segments of a wheel F, F. The cogs of these segments work into the teeth upon the rack bars, as represented in the figures. It will readily be seen that by moving the levers E E backward and forward the rack bars D, D, will be raised and lowered, and consequently the trucks C, C'.

The object of this invention is to raise portions of the car at a time to elevate it over obstructions upon the rail. It is particularly designed for use upon city railways, where the cars are frequently compelled to pass over water hose, which are extended along or across the streets.

In elevating the car over a piece of hose the truck wheels C, C', seen in Figure 1, are raised or the front ones are raised until they pass over the hose. As soon as they pass over they are thrown down upon the rail and by means of the levers, segments and rack bars the main car wheels are raised with the body of the car, as seen in Fig. 2, so that cars pass over the hose without touching or at least without cutting it. After the main wheels have passed over the body is lowered again and the rear truck wheels raised so that they may pass over. This operation may be easily and quickly performed whenever it becomes necessary.

By the plans now in use for conducting the cars over the hose, the cars are frequently thrown off and damaged and much time is lost.

Having thus fully described my invention, what I claim as new, and desire to secure by Letters Patent, is—

Raising and lowering the forward and rear trucks of the car substantially in the manner herein specified, whereby the car wheels are elevated so as to pass over obstructions upon the track, as and for the purpose set forth.

PETER I. BIDERMAN.

Witnesses:
C. M. ALEXANDER,
A. A. YETTMAN.